United States Patent
Durm et al.

(10) Patent No.: US 8,876,190 B2
(45) Date of Patent: Nov. 4, 2014

(54) AIR-GUIDING APPARATUS

(71) Applicant: Dr. Ing. h.c. F. Porsche Aktiengesellschaft, Stuttgart (DE)

(72) Inventors: Juergen Durm, Muehlacker (DE); Frank Haunstetter, Leonberg (DE); Johannes Karl Doll, Stuttgart (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/939,221

(22) Filed: Jul. 11, 2013

(65) Prior Publication Data
US 2014/0021742 A1    Jan. 23, 2014

(30) Foreign Application Priority Data
Jul. 18, 2012 (DE) .......................... 10 2012 106 452

(51) Int. Cl.
*B62D 35/00* (2006.01)
(52) U.S. Cl.
CPC .................................. *B62D 35/007* (2013.01)
USPC .................................. 296/180.1; 296/180.5
(58) Field of Classification Search
USPC .......................................... 296/180.1, 180.5
See application file for complete search history.

(56) References Cited

U.S. PATENT DOCUMENTS

| | | | |
|---|---|---|---|
| 7,322,638 B2 | 1/2008 | Larson | |
| 2008/0211261 A1* | 9/2008 | Wegener | 296/180.5 |
| 2011/0169299 A1* | 7/2011 | Goenueldinc | 296/180.5 |

FOREIGN PATENT DOCUMENTS

| | | |
|---|---|---|
| DE | 197 41 321 | 12/1998 |
| DE | 100 02 511 | 8/2001 |
| DE | 100 47 010 | 4/2002 |
| DE | 10 2005 030 203 | 1/2007 |
| DE | 10 2007 061 257 | 8/2009 |
| JP | 2005212719 | 8/2005 |

OTHER PUBLICATIONS

German Search Report of Mar. 27, 2013.

* cited by examiner

*Primary Examiner* — Joseph D Pape
(74) *Attorney, Agent, or Firm* — Gerald E. Hespos; Michael J. Porco; Matthew T. Hespos

(57) ABSTRACT

An air-guiding apparatus has a transversely oriented rear spoiler element that can be moved via hydraulic units into different setting positions with respect to the vehicle. An airflow breakaway edge is provided below the spoiler element and is configured to be set additionally to adjust effects of the spoiler element.

10 Claims, 6 Drawing Sheets

AIR-GUIDING APPARATUS

CROSS REFERENCE TO RELATED APPLICATION

This application claims priority under 35 USC 119 to German Patent Appl. No. 10 2012 106 452.0 filed on Jul. 18, 2012, the entire disclosure of which is incorporated herein by reference.

BACKGROUND

1. Field of the Invention

The invention relates to an air-guiding apparatus for a motor vehicle.

2. Description of the Related Art

DE 197 41 321 A1 discloses an air-guiding apparatus with a rear wing that can be moved from a retracted rest position to an extended operating position and vice versa. Two telescopic deployment elements serve to actuate the rear wing. The deployment elements are spaced from one another in the vehicle transverse direction and act on the underside of the rear wing. DE 100 47 010 C2 discloses an air-guiding apparatus with a wing-like guiding element connected to the vehicle via upright supporting plates. Adjusting devices between the supporting plates and the guiding element can modify the angle of attack of the guiding element with respect to the roadway. An air-guiding wall is integrated into the trunk lid and assists the function of the air-guiding apparatus.

It is an object of the invention to provide an air-guiding apparatus with rear spoiler elements for adjusting the aerodynamic properties and the driving behavior of a vehicle with regard to its downforce at the rear axle.

SUMMARY OF THE INVENTION

The invention provides adjustable air-guiding apparatuses that impart optimum aerodynamic properties to the vehicle and an improved driving behavior in different speed ranges. The air-guiding apparatus comprises an air-guiding element that interacts with a spoiler element, has an airflow breakaway edge, is arranged on the vehicle pivotably below a spoiler element and has a movement sequence from a basic position into a breakaway position and vice versa. The movement sequence is coupled to the retraction and extension movements of the spoiler element.

The spoiler element can be adjusted vertically by corresponding drive units, such as hydraulic units, from a storage position, which is flush with the vehicle body, into a position that is optimized with respect to the coefficient of drag, into a speed position above a predefined speed, and into a high-speed position. The air-guiding element has the airflow breakaway edge and, in the speed position, can be transferred via the adjusting device from a storage position that is flush with the vehicle body into a deployed breakaway position.

The individual positions of the spoiler element are fixed in accordance with the maximum effectiveness with regard to the coefficient of drag and the downforce at the rear axle for individual speed ranges. Furthermore, the airflow breakaway edge continuously has a deployed position at least between a position that is optimized with respect to the coefficient of drag and the speed position as far as the high-speed position. This adjustment of the spoiler element and the airflow breakaway edge depending on speed avoids an unfavorable coefficient of drag and suppresses lift at the rear axle.

The hydraulic unit preferably comprises a lifting cylinder, a setting cylinder and a front support for the spoiler element. The support is guided on a cylinder, and has a head bearing that can be pivoted about an axis for inclination settings of the spoiler element, which is connected to the setting cylinder.

The air-guiding element that forms the airflow breakaway edge is arranged between the hydraulic units and is held pivotably in a bearing block in the vehicle. The air-guiding element comprises the adjusting device, via which a basic and an active position of the air-guiding element and the position of the airflow breakaway edge can be set.

The adjusting device preferably has first and second coupling elements. The first coupling element can be pivoted about a rotational axis and is positively guided via a journal of the second coupling element, which journal is guided in a slotted guide. To this end, the first coupling element can be pivoted on the bearing block of the vehicle and is guided in a vertically pivotable manner on the second coupling element via the journal.

A roller preferably is arranged on the second coupling element at the lower end. The roller can be loaded via a stop on the bearing element of the rear cylinder during an adjusting movement of the spoiler element. This adjusting device achieves a situation where the airflow breakaway edge can be actuated while raising the spoiler element so that a vertically pivoted airflow breakaway edge is achieved by means of a subsequent movement at least in the case of a fully extended spoiler element. The vertical pivoting movement of the airflow breakaway edge preferably takes place before the spoiler element has reached its end position.

A spring preferably is arranged between the bearing block and the second coupling element. The spring enables the second coupling element to be adjusted back into its initial position by means of a return rotational movement that takes place when the spoiler element of the air-guiding apparatus is moved back into its basic position.

One exemplary embodiment of the invention is shown in the drawings and will be described in greater detail in the following text.

DETAILED DESCRIPTION OF THE PREFERRED EMBODIMENTS

Figure 1:
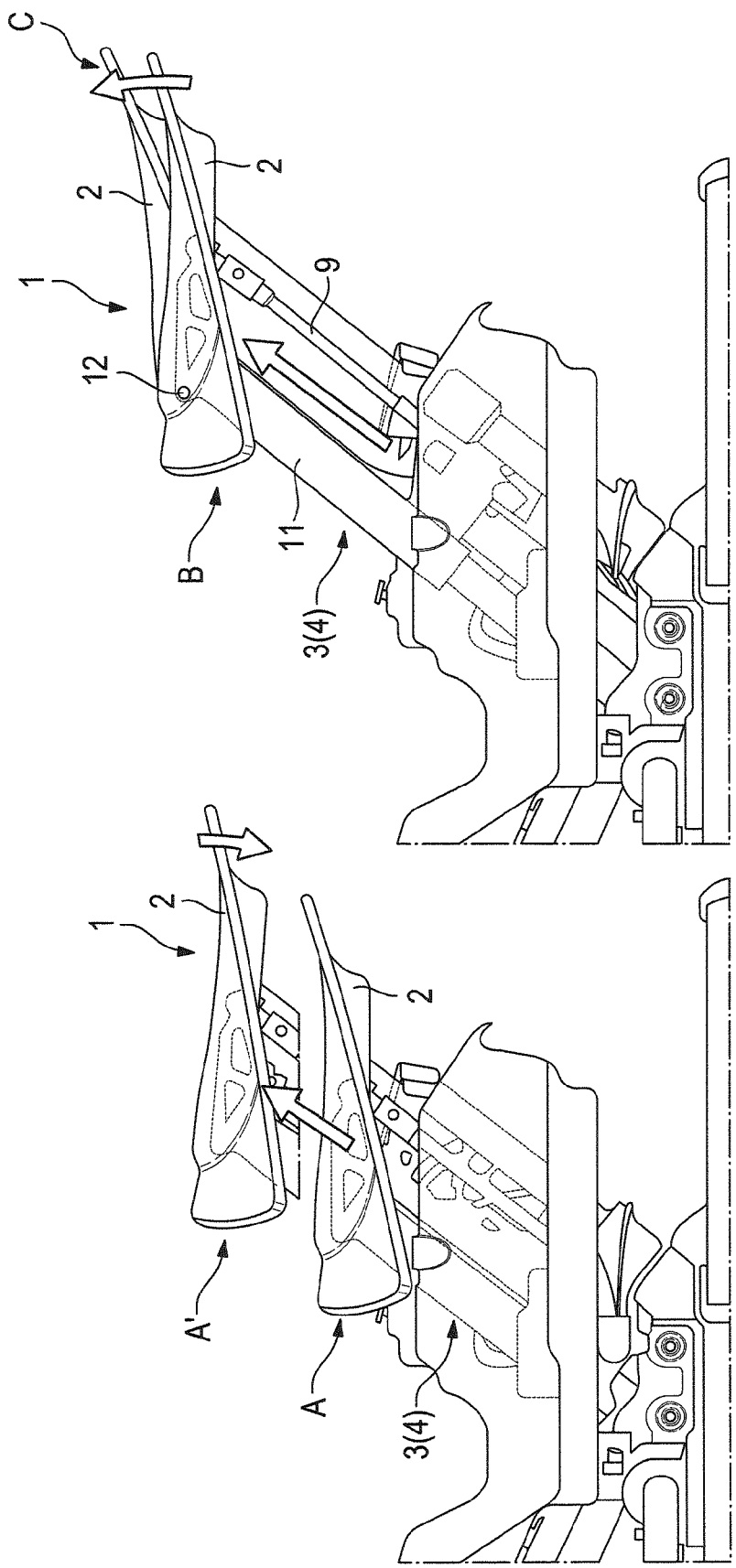
FIG. 1 is a side view of the air-guiding apparatus in four possible positions of the rear-side spoiler element.

An air-guiding apparatus 1 for a motor vehicle comprises a transversely oriented rear-side spoiler element 2 configured to be retracted and extended with respect to the vehicle via hydraulic units 3, 4. The air-guiding apparatus 1 has an air-guiding element 6 that interacts with the spoiler element 2 and has an airflow breakaway edge 5. The air-guiding element 6 is articulated pivotably on the vehicle below the spoiler element 2 and has a movement sequence that is coupled to the retraction and extension movements of the spoiler element 2, from a basic position I that is flush with the vehicle body into a pivoted breakaway position II.

The spoiler element 2 can be moved via the hydraulic units 3, 4 into different positions A, A', B and C. Position A is the storage position where the spoiler element 2 is flush with the vehicle body and from which the spoiler element 2 can be moved to further positions. For instance, position A' is a position of the spoiler element 2 that is optimized with respect to the coefficient of drag, and position B is assumed at a predefined speed. Position C is the highest position of the spoiler element 2 with respect to the vehicle. In the position C, the airflow breakaway edge 5 of the air-guiding element 6 is pivoted vertically out of the position that is flush with the vehicle body.

Figure 2:
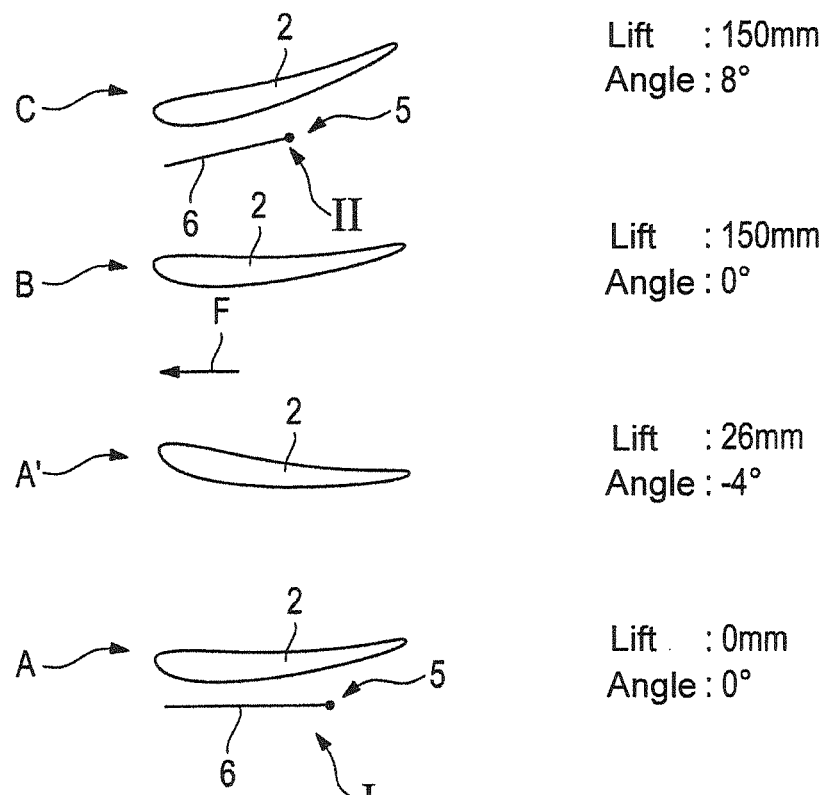
FIG. 2 is a diagrammatic illustration of the four positions of the spoiler element with specifications of the lift and the size of the angular settings.
Figure 3:
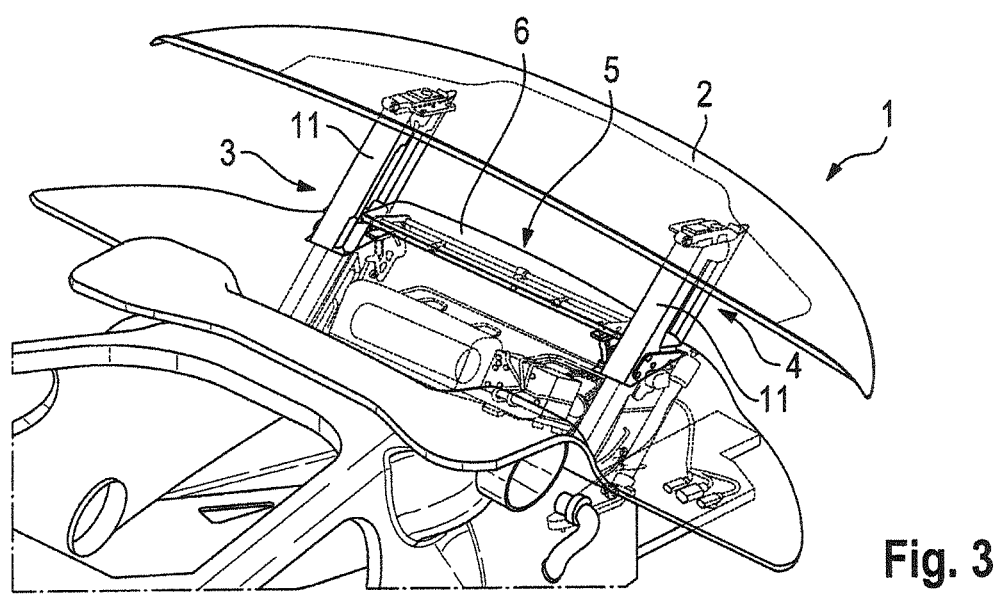
FIG. 3 is a diagrammatic illustration of the spoiler element extended in the highest position with an airflow breakaway edge arranged underneath.
Figure 4:
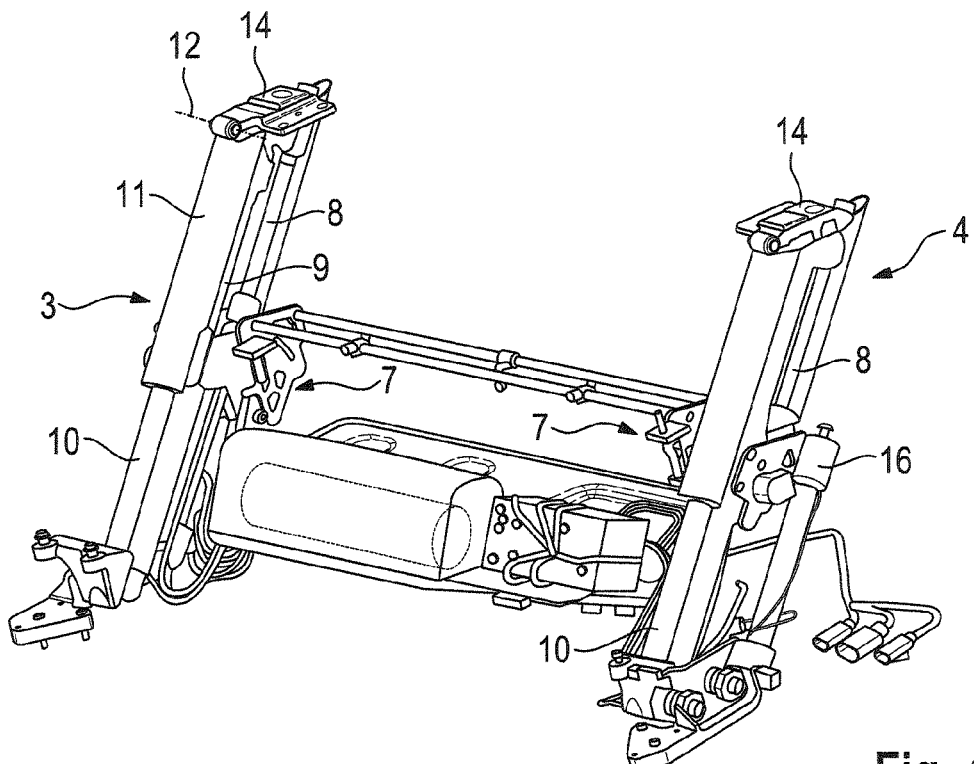
FIG. 4 is an illustration of the two hydraulic units with a receptacle arranged in between for the airflow breakaway edge with adjusting device.
Figure 5:
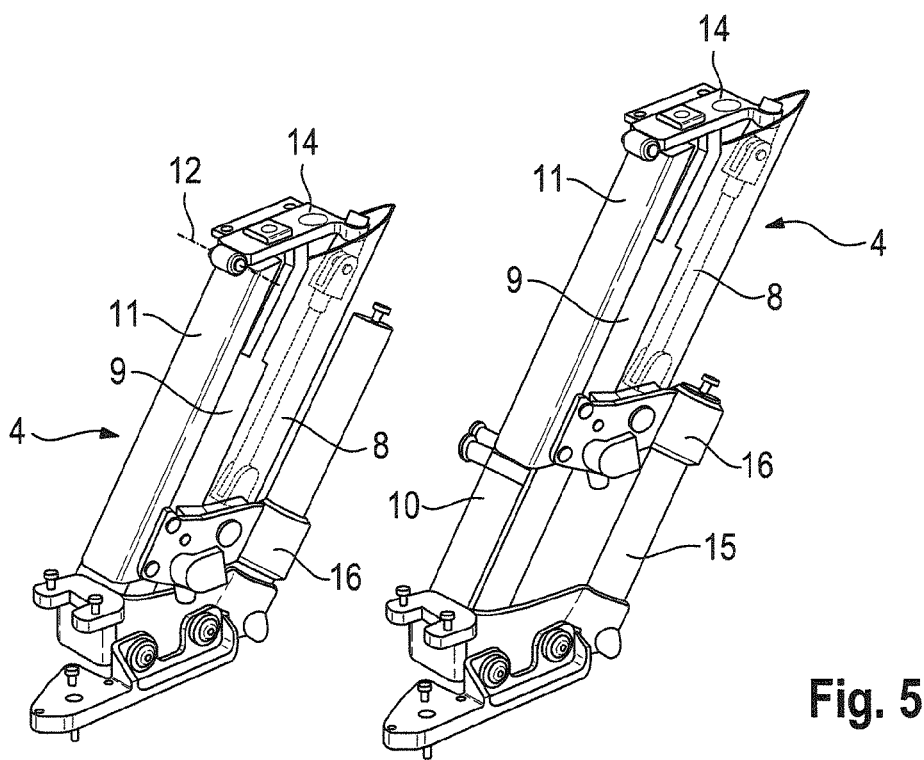
FIG. 5 is a view according to FIG. 4 with a retracted (left) and an extended (right) hydraulic unit.
Figure 6:
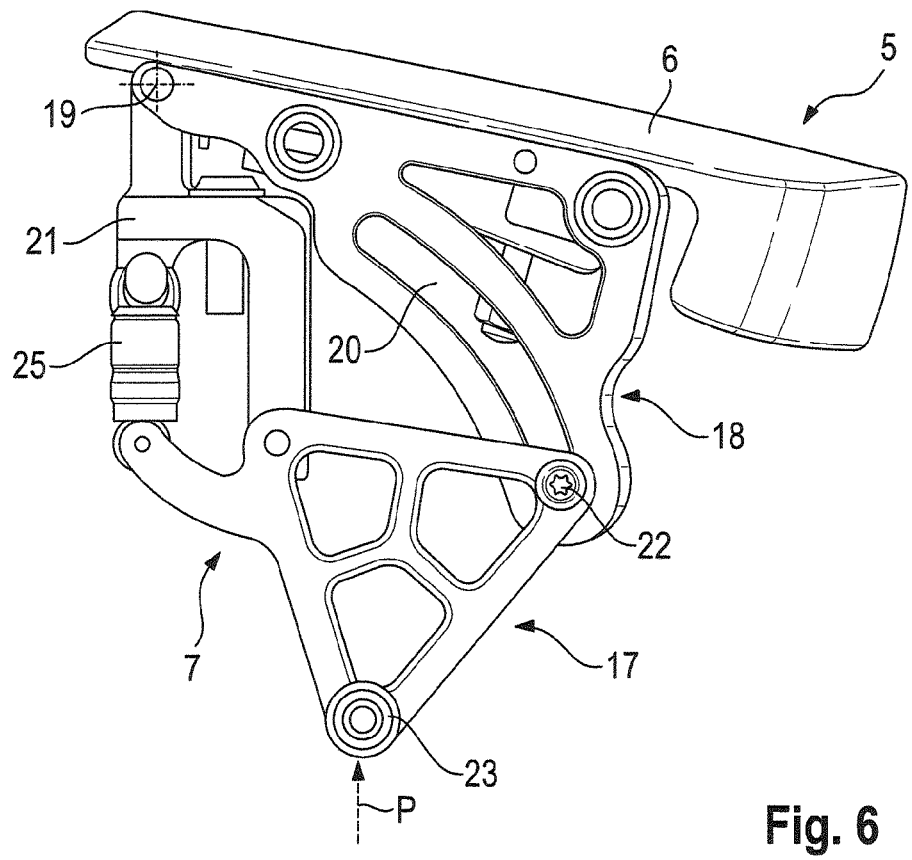
FIG. 6 is a side view of the adjusting device with two coupling elements and a retracted airflow breakaway edge.

The individual positions of the spoiler element 2 with the lift and angular settings are shown in greater detail in FIG. 2. In position A, in this embodiment, the spoiler element 2 has a lift of 0 mm and a spoiler setting of 0°. In position A', the spoiler element is raised with respect to position A by, for example, 26 mm above the vehicle, and has a negative spoiler inclination of, for example, −4° here. In position B, the spoiler element 2 is extended even further with respect to position A', for example by a lift of 150 mm, whereas the spoiler inclination has moved back to 0°. In position C, the spoiler element 2 remains raised as in position B, but assumes a positive spoiler inclination of, for example, 8°. These numeric values are only examples for one exemplary embodiment and can be adapted according to the desired aerodynamic behavior of the vehicle.

Position A is a storage position where the spoiler element 2 is flush with the vehicle body, position A' is a position that is optimized with respect to the coefficient of drag, position B is assumed in a manner dependent on the driving speed, for example at a driving speed above 70 km/h. Position C achieves a maximum downforce and is assumed, for example, at high speeds. The airflow breakaway edge 5 of the air-guiding element 6 is erected in position C and brings about increased rear axle downforce. The airflow breakaway edge 5 preferably is set continuously between positions A and C.

Each hydraulic unit 3, 4 comprises a hydraulic cylinder 8, a setting cylinder 9 and a front support 11 for the spoiler element 2. The support 11 is guided on a cylinder 10. A head bearing 14 is arranged on the support 11 and is connected to the setting cylinder 9. The head bearing 14 can be pivoted about an axis 12 for setting the inclination of the spoiler element. Each hydraulic unit 3, 4 further comprises a bearing element 16 that is guided on a rear cylinder 5 and is connected to the front support 11.

The airflow breakaway edge 5 of the air-guiding element 6 is arranged between the hydraulic units 3, 4 and is held pivotably in bearing blocks on the vehicle. The airflow breakaway edge 5 can be adjusted between a basic position I and an active position II via the adjusting device 7.

The adjusting device 7 comprises first and second coupling elements 18, 17. The first coupling element 18 to the spoiler element 2 can be pivoted about a stationary rotational axis 19 and has a slotted guide 20, in which a journal 22 of the second coupling element 17 is arranged movably.

Figure 7:
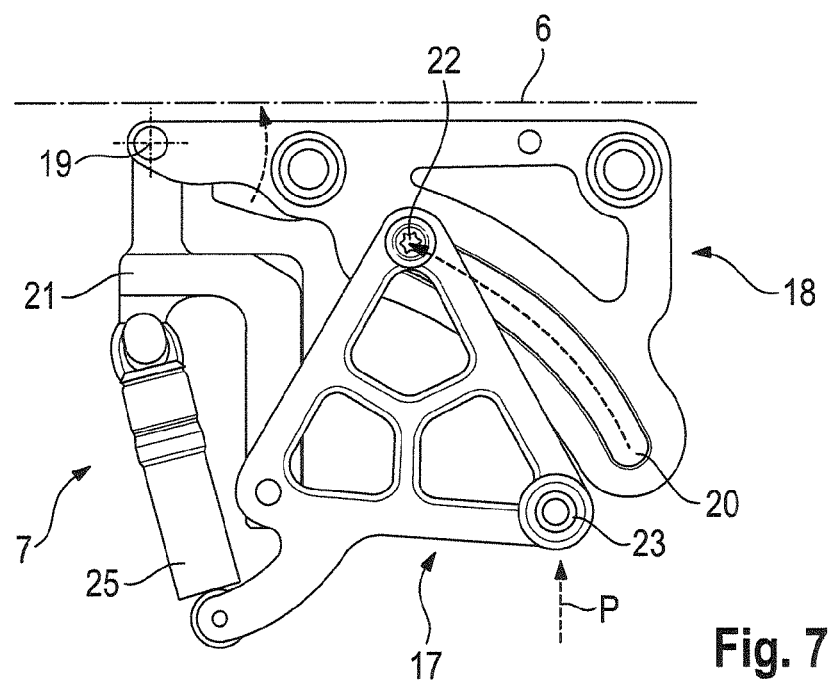
FIG. 7 is a side view according to FIG. 6 with an extended airflow breakaway edge.
Figure 8:
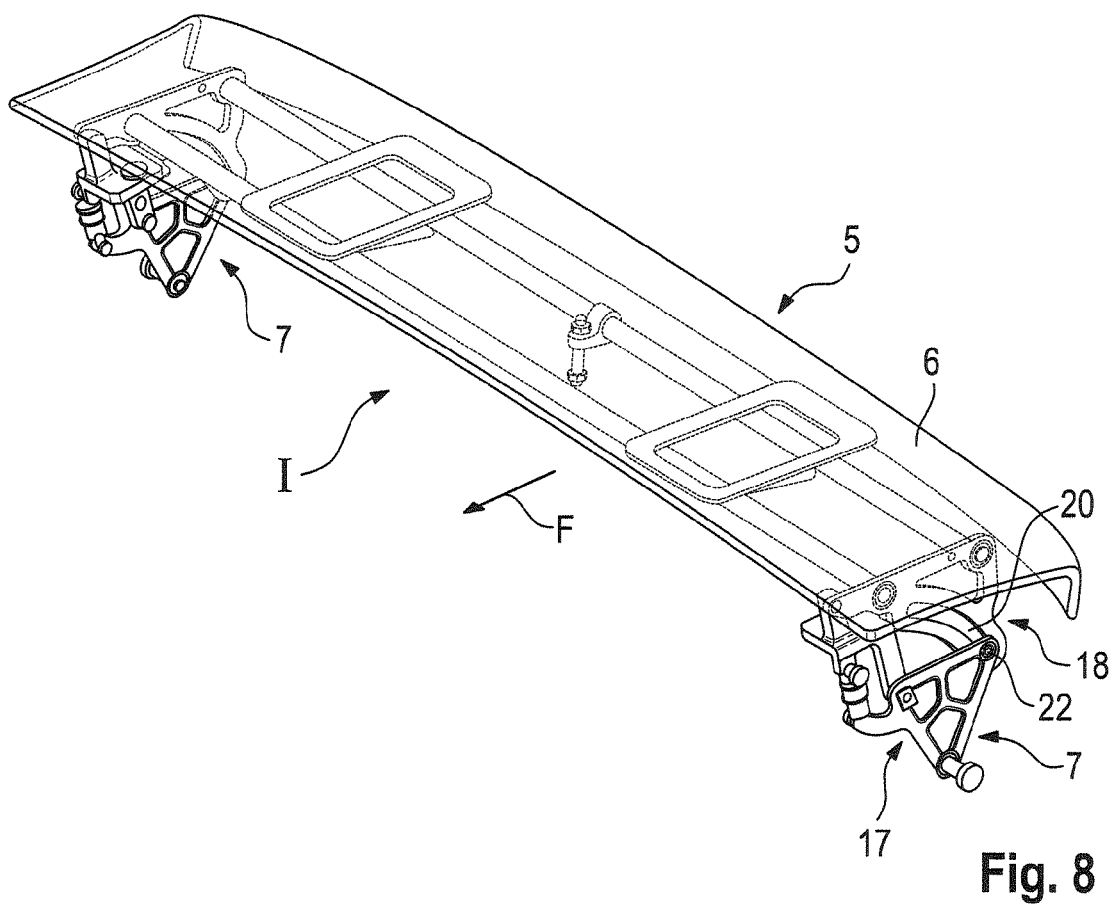
FIG. 8 is a view of the air-guiding element with an airflow breakaway edge in a retracted position which is flush with the vehicle body, with adjusting device.
Figure 9:
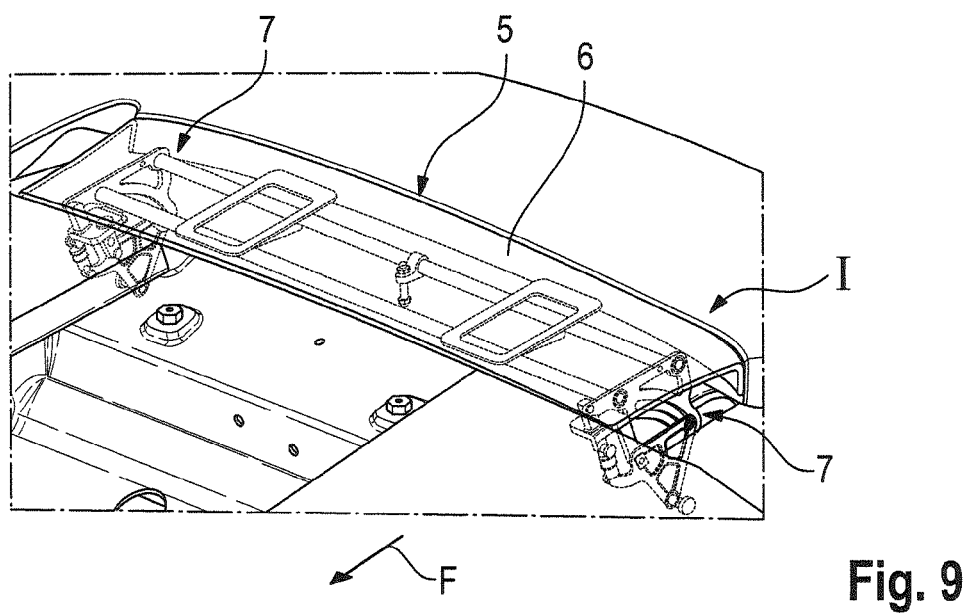
FIG. 9 is a view of the installed air-guiding element.
Figure 10:
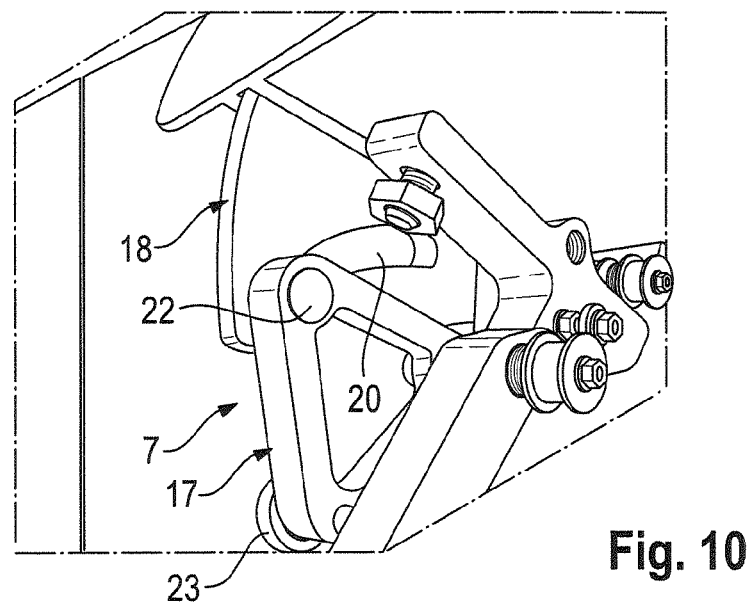
FIG. 10 is a detailed view of the adjusting device in the retracted position of the airflow breakaway edge.
Figure 11:
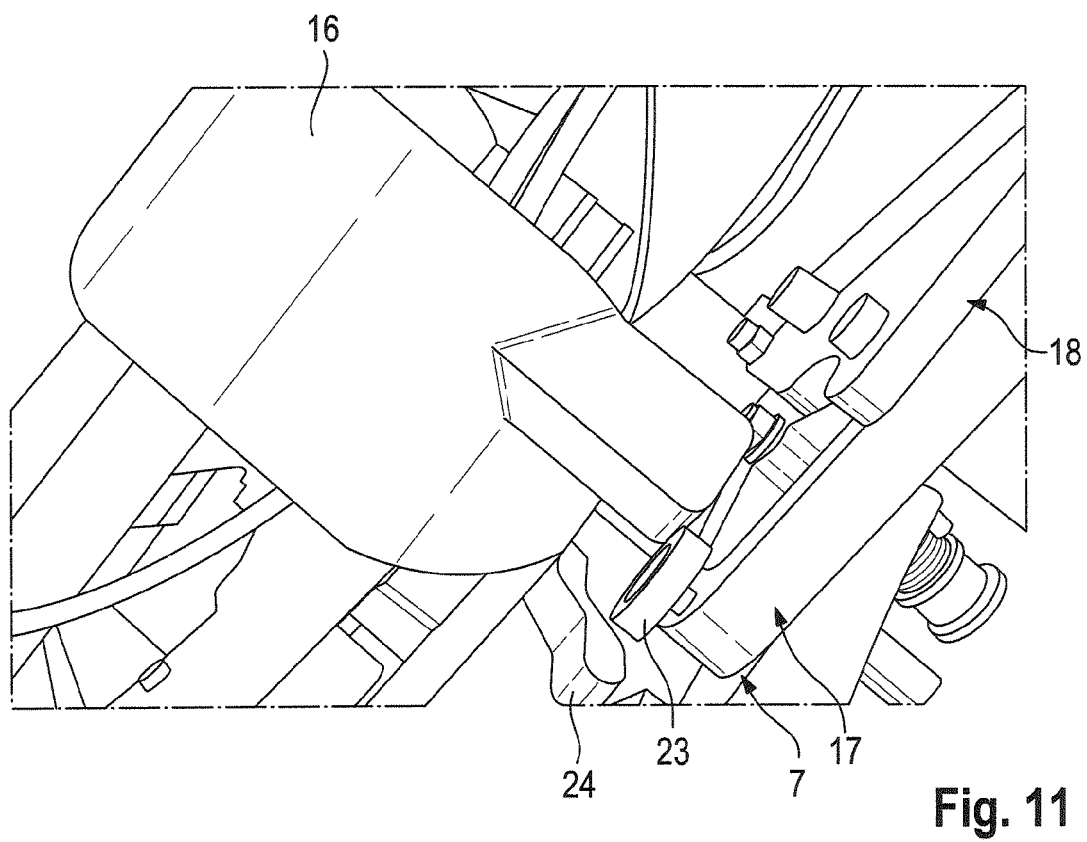
FIG. 11 is a detailed view of the vertically moved stop for the roller of the adjusting device.

The first coupling element 18 is mounted pivotably on the stationary bearing block 21 and is guided in the arcuate slotted track 20 via the journal 22 of the second coupling element 17. A roller 23 is arranged at the lower end of the second coupling element 17 and is used to adjust the second coupling element 17 and therefore the first coupling element 18. The roller 23 can be loaded via a stop 24 on the bearing element 16 of the rear cylinder 15 or on the support 11 during an adjusting movement of the spoiler element 2 via the hydraulic units 3, 4 from below, as shown by the arrow P in FIG. 7.

The loading roller 23 of the second coupling element 17 brings about a pivoting movement of the first coupling element 18 and therefore of the spoiler element 2 about the rotational axis 19 via the movement of the journal 22 in the slotted track 20 of the first coupling element 18, and the airflow breakaway edge 5 can be erected.

A spring element 25 produces a return rotational movement between the bearing block 21 and the second coupling element 17 to reset the coupling element 17 into the basic position I.

What is claimed is:

1. An air-guiding apparatus for a motor vehicle comprising:
    a transversely oriented rear-side spoiler element;
    hydraulic units disposed and configured to move the spoiler element between retracted and extended positions with respect to the vehicle; and
    an air-guiding element arranged below the spoiler element and having an airflow breakaway edge, the air-guiding element being pivotable between a basic position (I) and a breakaway position (II) with a movement sequence that is coupled to the retraction and extension movements of the spoiler element, each of the hydraulic units having a lifting cylinder, a setting cylinder and a front support for the spoiler element, the front support being guided on a cylinder and having a head bearing connected to the setting cylinder and being pivotable about an axis for setting an inclination of the spoiler element.

2. The air-guiding apparatus of claim 1, wherein the hydraulic units are disposed and configured for adjusting the spoiler element from a storage position (A) where the spoiler element is flush with a body surface of the motor vehicle into a position (A') that is optimized with respect to a coefficient of drag, into a speed-dependent position (B) and into a position (C) with maximum downforce, and an adjusting device that is operative when the spoiler element is in one of the positions (A'), (B) and (C) for pivoting the air-guiding element from the basic position (I), which is substantially flush with the vehicle body of the motor vehicle, into the breakaway position (II) where the airflow breakaway edge is pivoted up from the vehicle body.

3. The air-guiding apparatus of claim 2, wherein, in the storage position (A), the spoiler element is set at an angle of 0°; in the position (A'), the spoiler element (2) is at a negative angle and extended; in the position (B), the spoiler element is at an angle of 0° and is extended farther than the position (A'); and in the position (C), the spoiler element is at a positive angle.

4. The air-guiding apparatus of claim 2, wherein the air-guiding element which forms the airflow breakaway edge has a deployed position (II) at least between position (A') and position (B).

5. The air-guiding apparatus of claim 1, wherein the hydraulic unit comprises a bearing element that is guided on a rear cylinder and is connected to the front support.

6. The air-guiding apparatus of claim 1, wherein the air-guiding element is arranged between the hydraulic units of the spoiler element, the air-guiding apparatus further comprising an adjusting device for adjusting the air-guiding element between the basic and active positions (I and II).

7. An air-guiding apparatus for a motor vehicle, comprising:
   a transversely oriented rear-side spoiler element;
   hydraulic units disposed and configured to move the spoiler element between retracted and extended positions with respect to the vehicle; and
   an air-guiding element arranged below the spoiler element and having an airflow breakaway edge, the air-guiding element being pivotable between a basic position (I) and a breakaway position (II) with a movement sequence that is coupled to the retraction and extension movements of the spoiler element, the air-guiding element being arranged between the hydraulic units of the spoiler element; and
   an adjusting device for adjusting the air-guiding element between the basic and active positions (I and II), the adjusting device having a first coupling element that can be pivoted about a stationary rotational axis and a second coupling element operatively connected to the first coupling element via a journal in an arcuate slotted guide.

8. The air-guiding apparatus of claim 7, wherein the first coupling element is arranged pivotably on the stationary bearing block of the vehicle and is guided via the journal on the second coupling element in the arcuate slotted track of the first coupling element, and a roller is arranged on said coupling element at the lower end, the roller can be loaded via a stop on the bearing element of the rear cylinder during an adjusting movement of the spoiler element.

9. The air-guiding apparatus of claim 8, wherein if the roller is loaded on the second coupling element, the first coupling element is arranged to carry out a vertical pivoting movement about the mounting on the stationary bearing block.

10. The air-guiding apparatus of claim 9, further comprising a spring arranged between the bearing block and the second coupling element, the spring causing the second coupling element to be reset by undergoing a return rotational movement into an initial position.

* * * * *